US012031660B2

(12) United States Patent
Duncan et al.

(10) Patent No.: US 12,031,660 B2
(45) Date of Patent: Jul. 9, 2024

(54) MOTORIZED APPARATUS FOR PIPE INSPECTION AND REPAIR

(71) Applicant: General Electric Company, Schenectady, NY (US)

(72) Inventors: Alexander Kyle Duncan, Niskayuna, NY (US); Todd William Danko, Niskayuna, NY (US); Venkata Vijayaraghava Nalladega, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 17/589,625

(22) Filed: Jan. 31, 2022

(65) Prior Publication Data
US 2023/0243455 A1 Aug. 3, 2023

(51) Int. Cl.
| F16L 55/16 | (2006.01) |
| B05B 5/12 | (2006.01) |
| B05B 13/06 | (2006.01) |
| B05C 7/08 | (2006.01) |
| F16L 55/1645 | (2006.01) |
| F16L 55/32 | (2006.01) |
| G01N 21/954 | (2006.01) |
| F16L 101/16 | (2006.01) |
| F16L 101/30 | (2006.01) |

(52) U.S. Cl.
CPC ............ *F16L 55/1645* (2013.01); *B05B 5/12* (2013.01); *B05B 13/06* (2013.01); *B05C 7/08* (2013.01); *F16L 55/32* (2013.01); *G01N 21/954* (2013.01); *F16L 2101/16* (2013.01); *F16L 2101/30* (2013.01)

(58) Field of Classification Search
USPC ........ 118/306, 317, 712, 686, 687, 679–681, 118/58–60, 663, 665
See application file for complete search history.

(56) References Cited

U.S. PATENT DOCUMENTS

| 5,261,165 A | 11/1993 | Tate |
| 6,394,646 B1 | 5/2002 | Ringermacher et al. |

(Continued)

OTHER PUBLICATIONS

K. Zhang et al.,"Non-destructive Testing of Paint Coatings on Steel Plates by Ultrasonic Reflectometry", Journal of Nondestructive Evaluation,vol. 33,pp. 504-514, May 20, 2014.

(Continued)

*Primary Examiner* — Yewebdar T Tadesse
(74) *Attorney, Agent, or Firm* — Armstrong Teasdale LLP

(57) ABSTRACT

A system for use in maintaining a pipe includes a motorized apparatus including a body assembly and at least one maintenance device. The at least one maintenance device includes a sprayer, a heater, and an infrared sensor. The system includes at least one controller configured to apply the at least one coating material to the interior surface of the pipe at a work location using the sprayer, heat the interior surface of the pipe at the work location using the heater to begin a cure of the at least one coating material, generate one or more infrared images of the work location using the infrared sensor while using the heater to cure the at least one coating material, and perform a non-destructive evaluation (NDE) of the work location based on the one or more infrared images.

14 Claims, 5 Drawing Sheets

(56) References Cited

U.S. PATENT DOCUMENTS

| | | |
|---|---|---|
| 7,409,313 B2 | 8/2008 | Ringermacher et al. |
| 8,986,778 B2 | 3/2015 | Zombo |
| 9,476,535 B2 | 10/2016 | Warren |
| 2007/0259070 A1 | 11/2007 | Song et al. |
| 2014/0147600 A1* | 5/2014 | Neukirchen .......... C23C 24/106 427/535 |
| 2021/0025533 A1 | 1/2021 | Duncan et al. |
| 2021/0025534 A1 | 1/2021 | Duncan et al. |
| 2021/0025535 A1 | 1/2021 | Duncan et al. |
| 2021/0025536 A1 | 1/2021 | Duncan et al. |

OTHER PUBLICATIONS

D. Balageas et al.,"Thermal (IR) and Other NDT Techniques for Improved Material Inspection",Journal of Nondestructive Evaluation,vol. 35, Article No. 18, Jan. 19, 2016.

* cited by examiner

MOTORIZED APPARATUS FOR PIPE INSPECTION AND REPAIR

BACKGROUND

The field of the disclosure relates to motorized apparatus, and more particularly to motorized apparatus that travel through an interior cavity of pipes and perform a maintenance operation and/or an inspection operation within the pipes.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. However, the interior cavity of the pipes may be difficult to access for routine maintenance. For example, at least some known pipes are used to transport fluids having high temperatures, pressures, and/or other properties that create conditions which are inhospitable for at least some known maintenance apparatus. Moreover, at least some known pipes are difficult for at least some known apparatus to travel through because of the pipes' size and shape and obstacles within the interior cavity.

Accordingly, it is desirable to provide a system including a motorized apparatus configured to travel through an interior cavity of the pipes and perform inspection and/or repair operations within the pipes.

BRIEF DESCRIPTION

In one aspect, a system for use in maintaining a pipe having a sidewall defining an interior cavity and having an interior surface is provided. The system includes a motorized apparatus sized to fit within the interior cavity of the pipe. The motorized apparatus includes a body assembly extending along a longitudinal axis and at least one maintenance device coupled to the body assembly. The at least one maintenance device includes a sprayer configured to apply at least one coating material to the interior surface of the pipe, a heater configured to heat the interior surface of the pipe, and an infrared sensor configured to generate infrared images of the interior cavity of the pipe. The motorized apparatus also includes a plurality of leg assemblies coupled circumferentially around the body assembly, and a plurality of driven members coupled to the plurality of leg assemblies. The plurality of driven members are configured to engage with the interior surface of the pipe. The system also includes at least one controller communicatively coupled to the motorized apparatus and configured to move the motorized apparatus through the pipe using the plurality of driven members until a work location on the interior surface of the pipe is proximate to the body assembly. The controller is configured to apply the at least one coating material to the interior surface of the pipe at the work location using the sprayer, heat the interior surface of the pipe at the work location using the heater to begin a cure of the at least one coating material, generate one or more infrared images of the work location using the infrared sensor while using the heater to cure the at least one coating material, and perform a non-destructive evaluation (NDE) of the work location based on the one or more infrared images.

In another aspect, a method for use in maintaining a pipe having a sidewall defining an interior cavity and having an interior surface is provided. The method includes positioning a motorized apparatus within the interior cavity of the pipe. The motorized apparatus includes a body assembly extending along a longitudinal axis and at least one maintenance device coupled to the body assembly. The at least one maintenance device includes a sprayer configured to apply at least one coating material to the interior surface of the pipe, a heater configured to heat the interior surface of the pipe, and an infrared sensor configured to generate infrared images of the interior cavity of the pipe. The motorized apparatus also includes a plurality of leg assemblies coupled circumferentially around the body assembly and a plurality of driven members coupled to the plurality of leg assemblies. The plurality of driven members are configured to engage with the interior surface of the pipe. The method also includes moving the motorized apparatus through the interior cavity of the pipe using the plurality of driven members until a work location on the interior surface of the pipe is proximate to the body assembly, applying the at least one coating material to the interior surface of the pipe at the work location using the sprayer, heating the interior surface of the pipe at the work location using the heater to begin a cure of the at least one coating material, generating one or more infrared images of the work location using the infrared sensor while using the heater to cure the at least one coating material, and performing a non-destructive evaluation (NDE) of the work location based on the one or more infrared images.

In yet another aspect, a motorized apparatus for use in maintaining a pipe having a sidewall defining an interior cavity and having an interior surface is provided. The motorized apparatus includes a body assembly extending along a longitudinal axis and at least one maintenance device coupled to the body assembly. The at least one maintenance device includes a sprayer configured to apply at least one coating material to the interior surface of the pipe, a heater configured to heat the interior surface of the pipe, and an infrared sensor configured to generate infrared images of the interior cavity of the pipe. The motorized apparatus also includes a plurality of leg assemblies coupled circumferentially around the body assembly and a plurality of driven members coupled to the plurality of leg assemblies. The plurality of driven members are configured to engage with the interior surface of the pipe and move the motorized apparatus through the interior cavity of the pipe. The motorized apparatus is configured to receive instructions to apply the at least one coating material to the interior surface of the pipe at a work location using the sprayer, heat the interior surface of the pipe using the heater to begin a cure of the at least one coating material, generate one or more infrared images of the work location using the infrared sensor while using the heater to cure the at least one coating material, and perform a non-destructive evaluation (NDE) of the work location based on the one or more infrared images.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
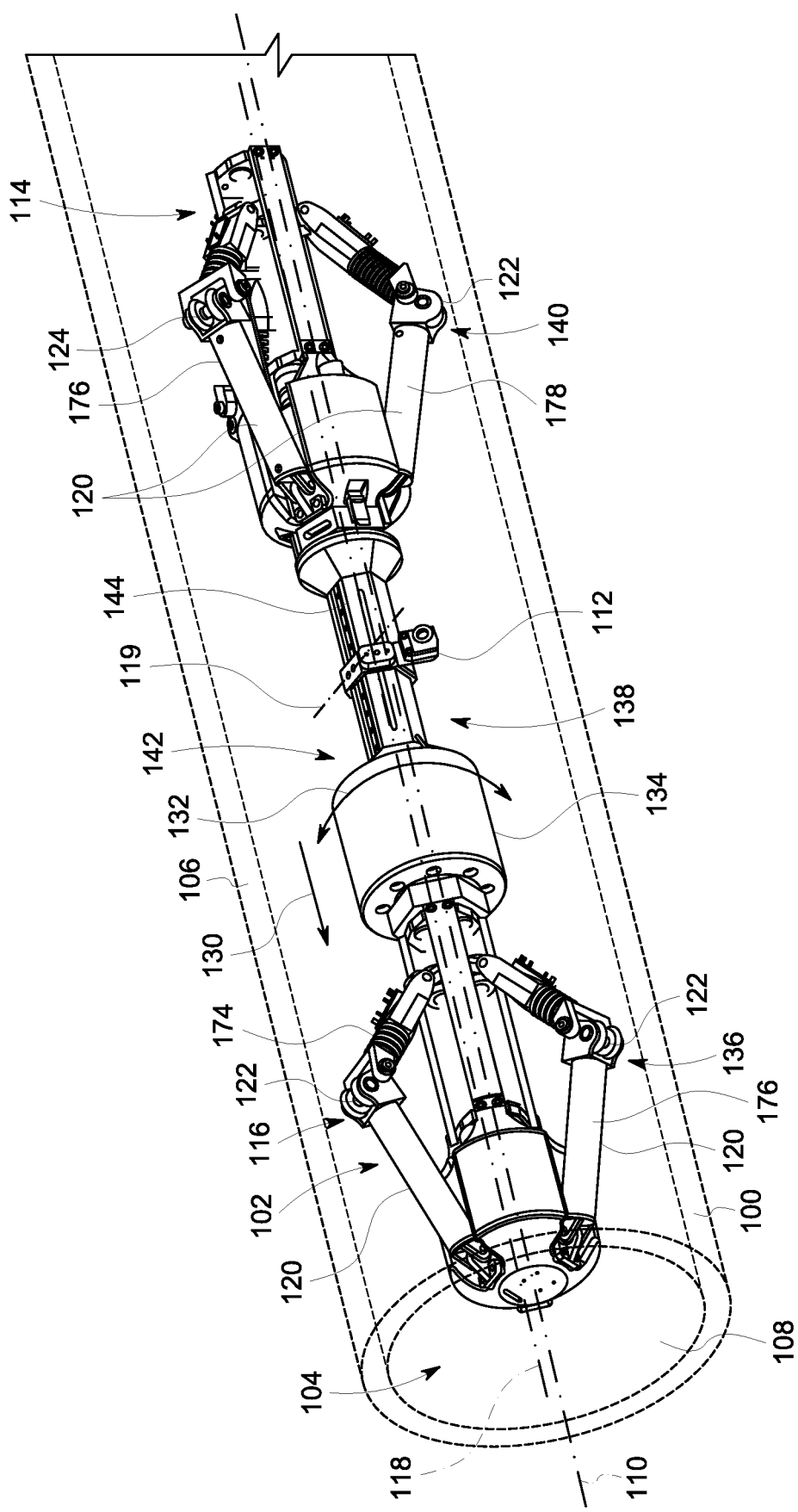
FIG. 1 is a perspective view of a portion of a pipe with a motorized apparatus traveling through an interior cavity of the pipe in an example embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system for inspecting and/or repairing pipes. The system includes a motorized apparatus for delivering inspection and repair tools to difficult to access locations within piping networks. The motorized apparatus includes various tools that are used to apply a coating material to the interior surface of the pipe at a work location, to generate heat at the work location to begin a cure of the coating material, and concurrently during the cure, to heat the work location to perform a thermal non-destructive evaluation (NDE) of the work location. The process of concurrent cure and NDE at the work location reduces the overall time taken to repair and inspect pipes, thereby providing a technical benefit in the art.

FIG. 1 is a perspective view of a portion of a pipe 100 with a motorized apparatus 102 traveling through an interior cavity 104 of pipe 100 in an example embodiment. In the example embodiment, pipe 100 includes a sidewall 106 having an interior surface 108 extending around a central axis 110 and defining interior cavity 104. Pipe 100 is cylindrical and has a diameter in a range of about 6 inches to about 36 inches or about 12 inches to about 36 inches. In some embodiments, pipe 100 has a length of at least 500 feet. In alternative embodiments, pipe 100 may be any shape and/or size.

Also, in the example embodiment, motorized apparatus 102 is configured to travel through interior cavity 104 of pipe 100 along a length of pipe 100. For example, in some embodiments, motorized apparatus 102 is configured to fit within interior cavity 104 and travel up to 500 feet along the length of pipe 100. Accordingly, motorized apparatus 102 facilitates inspection and repair of pipe 100 within interior cavity 104 at locations that are inaccessible from an exterior of pipe 100. Moreover, motorized apparatus 102 is self-propelled, meaning that motorized apparatus 102 moves within interior cavity 104 without an external force acting on motorized apparatus 102.

During operation, motorized apparatus 102 enters interior cavity 104 of pipe 100 from an opening or access hatch. Motorized apparatus 102 travels in a travel direction 130. In some embodiments, motorized apparatus 102 traverses transitions in pipe 100 such as bends or size transitions. When motorized apparatus 102 reaches a target location, motorized apparatus 102 goes into a parked mode, and a maintenance device 112 of motorized apparatus 102 is positioned relative to motorized apparatus 102 to perform a maintenance and/or repair operation.

As motorized apparatus 102 travels through interior cavity 104, motorized apparatus 102 is used to inspect and/or repair any interior components of pipe 100. For example, in some embodiments, motorized apparatus 102 is used to generate an image of interior surface 108, and the image is examined to determine whether repairs are warranted. If repairs are warranted, then motorized apparatus 102 is used to repair interior surface 108. For example, in some embodiments, motorized apparatus 102 applies a coating material to a portion of interior surface 108 and/or performs a NDE of the portion of interior surface 108. Interior surface 108 may be any surface within interior cavity 104 of pipe 100.

Motorized apparatus 102 includes a body assembly 114 and at least one drive system 116. Body assembly 114 of motorized apparatus 102 is sized to fit within interior cavity 104 and includes a longitudinal axis 118. Each drive system 116 is coupled to a leg assembly 120 and is configured to move body assembly 114 relative to pipe 100. For example, each drive system 116 includes a plurality of driven members 122, and a motor 128 (shown in FIG. 4) drivingly coupled to one or more of driven members 122. A power source 436 (shown in FIG. 4), such as a battery, provides power for operation of motor 128. In some embodiments, power is provided via a tether 302 (shown in FIG. 3). During operation, motor 128 causes rotation of driven members 122 in one or more selected directions to propel motorized apparatus 102. Motorized apparatus 102 moves along interior surface 108 as driven members 122 interact with interior surface 108. In FIG. 1, driven members 122 are illustrated as wheels, but driven members 122 may include tracks, or other types of selectively powered rotating features in other embodiments.

In the example embodiment, maintenance device 112 is coupled to body assembly 114. In some embodiments, maintenance device 112 is movable relative to body assembly 114. For example, maintenance device 112 can move translationally in travel direction 130 along body assembly 114 as well as rotate in rotation direction 132 about body assembly 114, offering maintenance device 112 a field of regard covering interior cavity 104 of pipe 100. A maintenance device actuator 134 is coupled to body assembly 114 and maintenance device 112 and is operable to move maintenance device 112 translationally along body assembly 114 and to rotate maintenance device 112 around body assembly 114.

Maintenance device 112 includes any device that enables maintenance device 112 to operate as described herein. For example, in some embodiments, maintenance device 112 includes, without limitation, any of the following tools 412 (shown in FIG. 4): an applicator, a drill, a grinder, a heater 438 (e.g., an induction heater or an inductive heater), a welding electrode, a sprayer 434 (e.g., for applying coatings to interior surface 108 of pipe 100), an infrared sensor 440 (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance device 112 is used to provide information for steering motorized apparatus 102 and/or to perform a maintenance operation.

In addition, in some embodiments, motorized apparatus 102 includes a light source (not shown) configured to illuminate at least a portion of interior cavity 104 to facilitate steering of motorized apparatus 102 and/or to allow maintenance device 112 to capture images. The light source may be coupled to body assembly 114 and, in some embodiments, is positionable relative to body assembly 114. In alternative embodiments, motorized apparatus 102 includes any light source that enables motorized apparatus 102 to operate as described herein.

Also, in the example embodiment, body assembly 114 is modular and includes a plurality of portions that are detachably coupled together. Specifically, body assembly 114 includes two drive systems 116 that include a first drive portion 136 and a second drive portion 140. Body assembly 114 further includes a maintenance device portion 138 disposed between first drive portion 136 and second drive portion 140.

In the example embodiment, first drive portion 136 and second drive portion 140 are coupled to opposite ends of maintenance device portion 138. Maintenance device portion 138 includes a maintenance body 142. Maintenance body 142 forms a portion of body assembly 114 when maintenance device portion 138 is coupled to at least one other portion 136, 138, 140. Maintenance body 142 includes an axial track 144 for maintenance device 112 to move along. In alternative embodiments, maintenance device portion 138 includes any maintenance body 142 that enables motorized apparatus 102 to operate as described herein.

Figure 2:
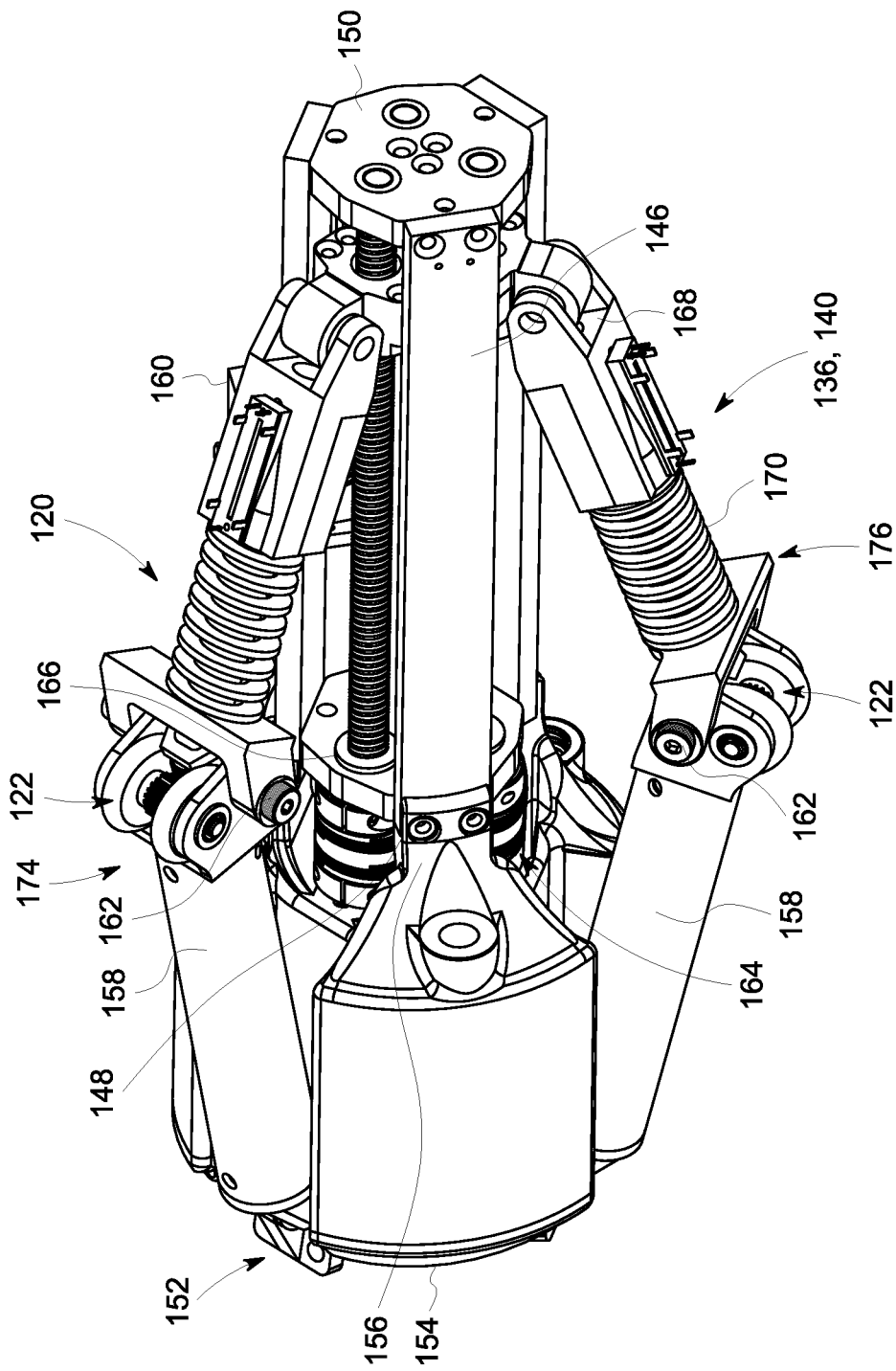
FIG. 2 is a perspective view of a portion of the motorized apparatus shown in FIG. 1 in an example embodiment.

FIG. 2 is a perspective view of drive portions 136, 140 of motorized apparatus 102 in an example embodiment. In the example embodiment, drive portions 136, 140 are identical and are able to couple to either end of maintenance device portion 138 (shown in FIG. 1) and/or to each other. Accordingly, drive portions 136, 140 are interchangeable and are able to be removed and, if warranted, replaced.

Also, in the example embodiment, each drive portion 136, 140 includes a support 146 including a support first end 148 and support second end 150, and a housing 152 including a housing first end 154 and a housing second end 156. Support first end 148 is coupled to housing second end 156.

Moreover, in the example embodiment, each drive portion 136, 140 includes a plurality of leg assemblies 120. Leg assemblies 120 each include a first leg portion 158 rotatably coupled to housing 152, and a second leg portion 160 moveably coupled to second end 150 of support 146. First leg portion 158 and second leg portion 160 are rotatably coupled together at a joint 162. Leg assemblies 120 are positioned circumferentially around support 146.

In the example embodiment, motorized apparatus 102 includes at least three leg assemblies 120 coupled to each drive portion 136, 140. Each leg assembly 120 is independently actuated and antagonistically positioned to maintain a constant contact force against the sidewall 106. Motorized apparatus 102 is able to tilt and shift relative to the axis of pipe 100 by controlling the position of leg assemblies 120. In alternative embodiments, motorized apparatus 102 includes any leg assemblies 120 that enable motorized apparatus 102 to operate as described herein.

In addition, in the example embodiment, each drive portion 136, 140 includes at least one actuator assembly 164 configured to independently position second leg portions 160 of leg assemblies 120 relative to support 146. In the example embodiment, each leg assembly 120 is positioned relative to support 146 by rotating a screw drive 166 engaged with the respective second leg portion 160. In the example embodiment, actuator assembly 164 is housed in housing 152. In alternative embodiments, drive portion 136, 140 includes any actuator assembly 164 that enables motorized apparatus 102 to operate as described herein.

Moreover, in the example embodiment, second leg portion 160 includes a telescoping portion 168 and a bias member 170. In the example embodiment, bias member 170 is a spring. In other embodiments, bias member 170 may be another device capable of storing potential energy. Devices able to store potential energy may incorporate a piston, a plunger, or one or more magnets. Telescoping portion 168 is rotatably coupled to first leg portion 158 of leg assembly 120 at joint 162. In the example embodiment, an elongate portion of telescoping portion 168 is housed within bias member 170 and an outer portion of telescoping portion 168 is positioned adjacent bias member 170 and slidably receives the elongate portion within an interior cavity. Bias member 170 exerts a force against telescoping portion 168 in a direction substantially away from second end 150 of support 146. The force of bias member 170 against telescoping portion 168 biases leg assemblies 120 in a radially outward position. In alternative embodiments, second leg portion 160 is configured to move in any manner that enables leg assemblies 120 to function as described herein.

Moreover, in the example embodiment, each leg assembly 120 includes joint 162 rotatably coupling first leg portion 158 to second leg portion 160. For example, joints 162 include pins and bearings that engage the ends of first leg portions 158 and second leg portions 160 opposite body assembly 114. Joints 162 define an outermost radius of motorized apparatus 102. Moreover, joints 162 are configured to move radially relative to longitudinal axis 118 of motorized apparatus 102 when leg assemblies 120 are actuated. In alternative embodiments, leg assemblies 120 include any joints that enable motorized apparatus 102 to operate as described herein.

Figure 4:
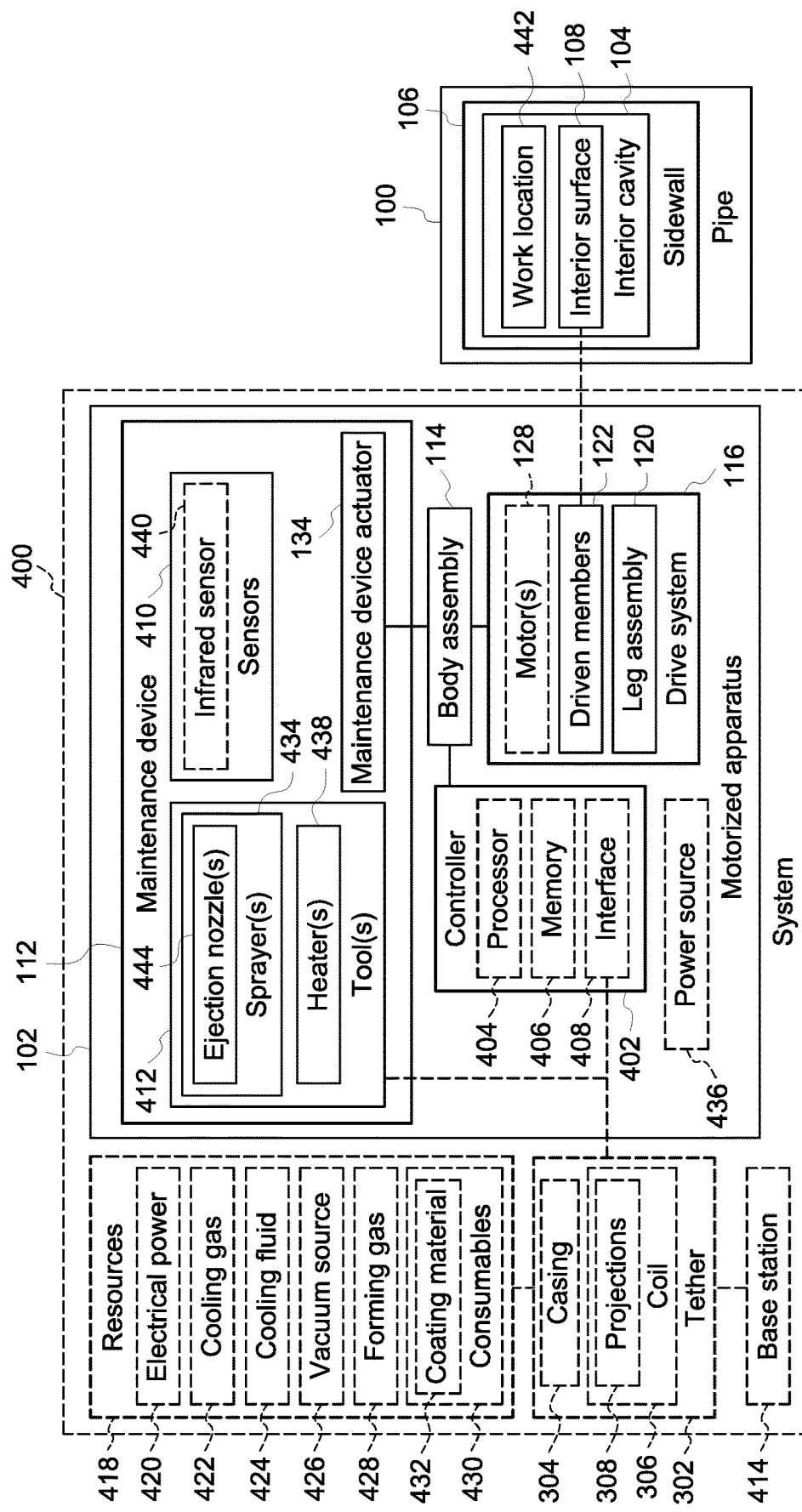
FIG. 4 is a block diagram of a system for use in maintaining pipes in an example embodiment.

Referring to FIGS. 1, 2, and 4, drive portions 136, 140 include drive systems 116 configured to propel motorized apparatus 102 through interior cavity 104 of pipe 100. For example, driven members 122 such as wheels on each drive portion 136, 140 interact with sidewall 106 and are driven by one or more motors 128 (shown in FIG. 4) to propel motorized apparatus 102 along pipe 100. In the example embodiment, driven members 122 are coupled to joints 162 of leg assemblies 120. In the example embodiment, driven members 122 are arranged to facilitate driving of motorized apparatus 102 in multiple directions.

In addition, in the example embodiment, leg assemblies 120 are arranged in sets of three (a first leg assembly 174, a second leg assembly 176, and a third leg assembly 178) and the sets are circumferentially spaced about longitudinal axis 118 on each drive portion 136, 140. Also, each drive portion 136, 140 includes driven members 122 coupled to first leg assembly 174, second leg assembly 176, and third leg assembly 178.

Also, in the example embodiment, leg assemblies 120 are positionable relative to body assembly 114 and facilitate motorized apparatus 102 traversing different transitions of pipe 100 (e.g., pipe size changes and bends). For example, leg assemblies 120 are positionable to support motorized apparatus 102 in a portion of pipe 100 having a reduced diameter by moving joints 162 of leg assemblies 120 closer to body assembly 114 using actuator assembly 164. In addition, leg assemblies 120 are able to adjust the radial position and/or orientation of body assembly 114 relative to a central axis of pipe 100. Moreover, motorized apparatus 102 is able to traverse non-concentric transitions because leg assemblies 120 are positionable and configured to traverse different transitions.

Figure 3:
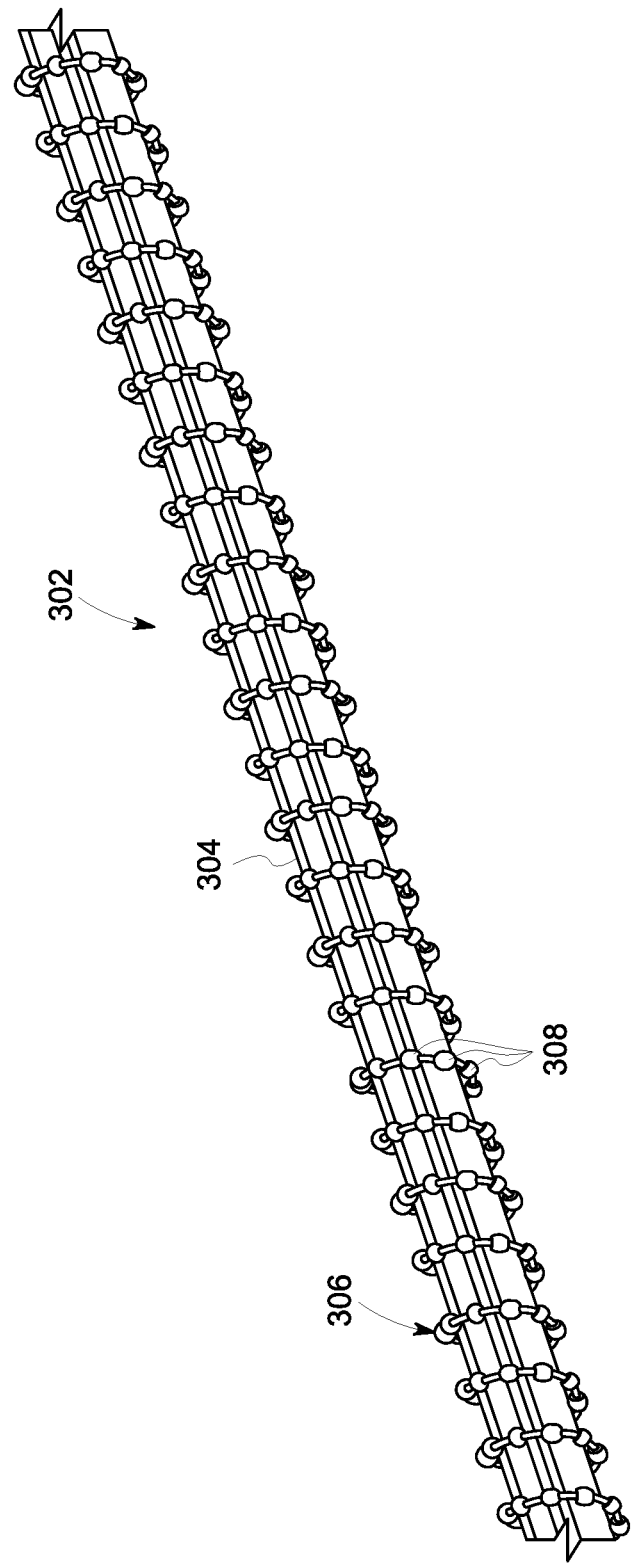
FIG. 3 is a perspective view of a tether for the motorized apparatus of FIG. 1 in an example embodiment.

FIG. 3 is a perspective view of tether 302 in an example embodiment. In the example embodiment, tether 302 includes a casing 304, which surrounds and protects one or more internal conduits, channels, wires, optical cables, etc., (not shown) that are used to provide materials and/or electrical power and/or communication capabilities to motorized apparatus 102 from an external entity (e.g., a base station 414 external to the pipe 100, shown in FIG. 4).

In some embodiments, casing 304 of tether 302 is wrapped by a coil 306, which includes projections 308. Coil 306 and projections 308 attached to coil 306 separate casing 304 from interior surface 108 of pipe 100. Projections 308 are shaped to provide minimal contact with interior surface 108 of pipe 100. In some embodiments, projections 308 are spherical. In addition, projections 308 include a material providing less friction and less thermal conductivity than coil 306 and/or casing 304. In some embodiments, projections 308 include a low friction and/or insulative coating. As a result, projections 308 reduce an amount of friction between casing 304 and interior surface 108 of pipe 100 and, therefore, reduce the amount of force used to pull tether 302 as motorized apparatus 102 moves through pipe 100. In addition, projections 308 reduce heat transfer from pipe 100 to casing 304. In some embodiments, projections 308 include ceramic beads.

FIG. 4 is a block diagram of a system 400 for use in maintaining pipes in an example embodiment. In the example embodiment of system 400, motorized apparatus 102 includes a controller 402. Controller 402 includes [check for and fix globally in spec] any component, system, or device that controls the operation of motorized apparatus 102 as described herein. In some embodiments, controller 402 includes a processor 404, a memory 406, and an interface 408, in any combination. Processor 404 includes any electronic circuits and/or optical circuits that are able to perform functions described herein for controller 402.

Memory 406 includes any electronic circuits and/or optical circuits and/or magnetic circuits that are able to store data. For instance, memory 406 may store information regarding one or more sensors 410 (including but not limited to any sensor described herein, such as infrared sensor 440) on maintenance device 112, which may then be used by processor 404 to reposition maintenance device 112 to orient one or more tools 412 (including but not limited to any tool described herein, such as sprayers 434 and heaters 438) during a maintenance process on pipe 100.

Interface 408 of controller 402 includes any component, system, or device that enables communication between motorized apparatus 102 and another entity (e.g., a base station 414). Such communications include wired communications (e.g., Ethernet) and wireless communications (e.g., Wi-Fi, Cellular, etc.) in various embodiments.

In some embodiments, interface 408 is communicatively coupled to base station 414 via a wired communication channel (not shown) provided by tether 302. In other embodiments, interface 408 is communicatively coupled to base station 414 via a wireless communication channel (not shown).

In this embodiment, base station 414 includes any component, system, or device that facilitates interaction between a remote operator 416 and motorized apparatus 102. For example, base station 414 may include a user interface (not shown) that facilitates, by remote operator 416, the analysis of data from sensors 410, the operation of tools 412 on maintenance device 112, the operation of drive systems 116 of motorized apparatus 102, the repositioning of maintenance device 112, etc. The user interface may include, displays, joysticks, mice, trackballs, keyboards, etc.

In some embodiments, system 400 provides various resources 418 to motorized apparatus 102 via tether 302. Resources 418 provided to motorized apparatus 102 include, without limitation, one or more of electrical power 420, a cooling gas 422, a cooling fluid 424, a vacuum source 426, a forming gas 428, and consumables 430. In some embodiments, cooling gas 422 and/or cooling fluid 424 is used to provide cooling to various components of motorized apparatus 102 (e.g., controller 402, drive systems 116, sensors 410, tools 412, etc.). In other embodiments, forming gas 428 is used to provide cooling to motorized apparatus 102 and/or is ejected by nozzles (not shown) to control the atmosphere around motorized apparatus 102 (e.g., at a work location 442 within the pipe 100). Further, consumables 430 provided by tether 302 to motorized apparatus 102 include, any type of material used by the tools 412, including but not limited to welding wire, flux, paint, an exothermic material, an endothermic material, a thermoset polymer, an adhesive, a polyethylene, or other types of coating materials 432 that are applied to interior surface 108 of pipe 100. Vacuum source 426 in some embodiments is coupled to one or more of the nozzles (not shown) at motorized apparatus 102 in order to remove debris in the area around motorized apparatus 102 (e.g., at the target location X).

In some embodiments, drive systems 116 of motorized apparatus 102 include one or more motors 128 that generate torque for driven members 122 to move motorized apparatus 102 in a travel direction. In an embodiment, motorized apparatus 102 includes a power source 436 that provides power for the operation of the motors 128 that generate torque for driven members 122. In some embodiments, power source 436 is electrical power, and the electrical power is provided by batteries (not shown) at motorized apparatus 102 and/or via tether 302 attached to motorized apparatus 102.

Figure 6:
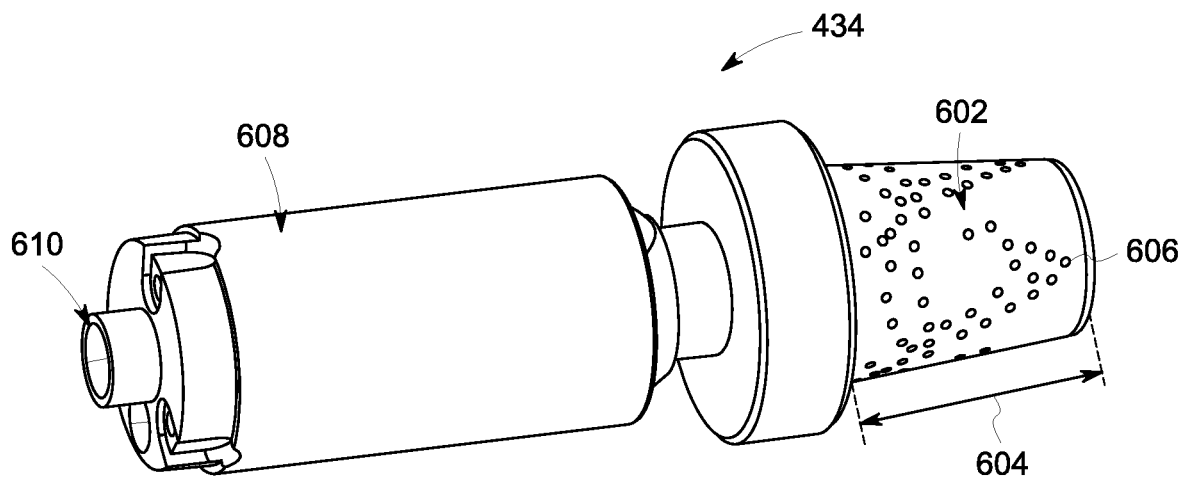
FIG. 6 is a perspective view of a sprayer for applying a coating material to the interior of pipes in an example embodiment.

In this embodiment, sprayer(s) 434 of maintenance device 112 include any component, system, or device that applies, ejects, or directs coating material 432 towards or upon interior surface 108 of pipe 100 using one or more ejection nozzles 444. Further in this embodiment, heater(s) 438 of maintenance device 112 include any component, system, or device that heats pipe 100 and/or coating material 432 applied to pipe 100. Moreover, in this embodiment, infrared sensor 440 includes any component, system, or device that generates infrared images or infrared data of an object, such as interior surface 108 of pipe 100 and/or coating material 432 applied to interior surface 108 of pipe 100. In one embodiment, sprayer 434 is a centrifugal sprayer as depicted in the example embodiment of FIG. 6, which may be mounted to a front portion of motorized apparatus 102 or may be pulled behind motorized apparatus 102 on a sled. In this embodiment, sprayer 434 includes a rotating centrifuge 602 having an elongated body 604 with holes 606 therethrough. In this embodiment, centrifuge 602 of sprayer 434 spins when driven by a motor 608 of sprayer 434, and inertia causes coating material 432 supplied to a coating material inlet 610 of sprayer 434 to disperse outward from a central portion of centrifuge 602 through holes 606. In an embodiment, the rotation of centrifuge 602 is powered by pressurized air rather than motor 608.

Figure 5:
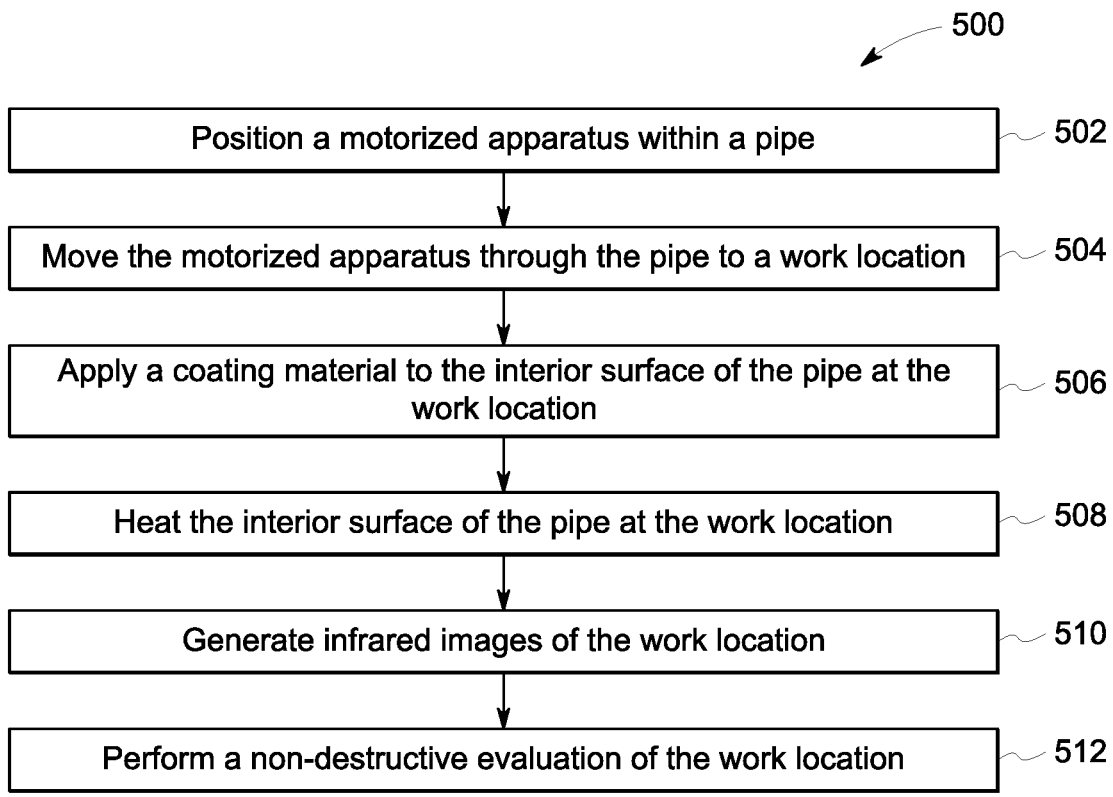
FIG. 5 is a flow chart of a method of maintaining a pipe in an example embodiment.

FIG. 5 is a flow chart of a method 500 of maintaining pipes in an example embodiment. Method 500 will be discussed with respect to system 400 depicted in FIG. 4, although method 500 may be performed by other systems, not shown. The steps of method 500 are not all inclusive, and may include other steps, not explicitly shown or described herein. Further, the steps of method 500 may be performed in a different order.

To begin an inspection and/or repair process on interior surface 108 of pipe 100, motorized apparatus 102 is placed into interior cavity 104 of pipe 100 from an opening in pipe 100 and/or through an access hatch in pipe 100 (see step 502 of FIG. 5). Motorized apparatus 102 travels in a travel direction through interior cavity 104 of the pipe 100, which extends in either direction along a length of pipe 100. For example, the controller 402 directs drive system 116 to rotate driven members 122 (e.g., via motors 128), which contact the interior surface 108 of pipe 100 and propel motorized apparatus 102 through pipe 100.

In some embodiments, motorized apparatus 102 traverses transitions in pipe 100 such as bends in pipe 100 or transitions in the size of pipe 100 by modifying the radial position of leg assemblies 120 relative to longitudinal axis 118 (see FIG. 1). Motorized apparatus 102 continues moving through pipe 100 until motorized apparatus 102 reaches work location 442 on interior surface 108 of pipe 100 (see step 504 of FIG. 5). In particular, motorized apparatus 102 moves through pipe 100 until work location 442 is proximate to body assembly 114.

When motorized apparatus 102 reaches work location 442, motorized apparatus 102 enters into a parked mode. For example, the rotation of driven members 122 is stopped at work location 442 and, in some embodiments, motorized apparatus 102 parks by positioning leg assemblies 120 such that an increased force is provided on interior surface 108 from leg assemblies 120.

In some embodiments, motorized apparatus 102 detects characteristics of pipe 100 around motorized apparatus 102 when motorized apparatus 102 is parked within interior cavity 104. For example, in some embodiments, a map is generated of interior surface 108 around motorized apparatus 102 when motorized apparatus 102 is parked at work location 442. After the map is generated, motorized apparatus 102 is able to perform a maintenance operation on interior surface 108 based on information from the map. Accordingly, motorized apparatus 102 is able to operate even if sensors are unable to provide information during a maintenance operation.

In some embodiments, controller 402 determines a position of maintenance device 112 relative to a target on interior surface 108 when motorized apparatus 102 is parked at work location 442. For example, controller 402 determines positions of motorized apparatus 102 and/or maintenance device 112 based on information acquired from one or more sensors 410. Controller 402 compares the determined positions to a map of interior surface 108 and determines a desired position of maintenance device 112 based on one or more operating parameters of a maintenance and/or inspection process. Controller 402 determines a difference between the determined position of maintenance device 112 and the desired position of maintenance device 112 required for a maintenance and/or an inspection process. Controller 402 determines instructions for one or more maintenance device actuators 134 to position maintenance device 112 in the desired position. For example, the instructions may cause maintenance device actuator 134 to move maintenance device 112 along a length of body assembly 114 and/or rotate maintenance device 112 about longitudinal axis 118. In some embodiments, maintenance device actuator 134 is able to move maintenance device 112 along the length of body assembly 114 and rotate maintenance device 112 about longitudinal axis 118 simultaneously or sequentially. Controller 402 determines the amount of rotation and translation required to reach a desired position. Suitably, maintenance device 112 is able to move in at least three directions which facilitate maintenance device 112 reaching a desired position quicker and maintenance device 112 having a larger area of regard. In some embodiments, controller 402 checks the position of maintenance device 112 after maintenance device 112 translates and/or rotates and controller 402 makes adjustments to precisely position maintenance device 112 for a maintenance and/or inspection process.

With motorized apparatus 102 parked at work location 442, motorized apparatus 102 utilizes sprayer 434 to apply coating material 432 to interior surface 108 of pipe 100 (see step 506 of FIG. 5). For example, controller 402 operates maintenance device actuator 134 to move maintenance device 112 along a length of body assembly 114 and/or rotate maintenance device 112 about longitudinal axis 118 to orient ejection nozzles 444 of sprayer 434 towards interior surface 108 of pipe 100. In one embodiment, coating material 432 is supplied to motorized apparatus 102 by tether 302. In another embodiment, coating material 432 is stored locally at motorized apparatus 102. In one embodiment, coating material 432 includes one or more of an exothermic coating material, an endothermic coating material, a thermoset polymer, an adhesive, and/or a polyethylene.

In some embodiments, motorized apparatus 102 utilizes heater 438 to heat interior surface 108 of pipe 100 prior to applying coating material 432. For example, controller 402 may operate heater 438 to heat interior surface 108 of pipe 100 prior to applying coating material 432 when coating material 432 is viscous, thereby reducing the amount of flow of coating material 432 when coating material 432 is applied to interior surface 108 by sprayer 434.

Motorized apparatus 102 utilizes heater 438 to heat interior surface 108 of pipe 100 to begin a cure of coating material 432 (see step 508 of FIG. 5). For example, controller 402 operates maintenance device actuator 134 to move maintenance device 112 along a length of body assembly 114 and/or rotate maintenance device 112 about longitudinal axis 118 to position heater 438 proximate to interior surface 108 of pipe 100. The heat generated by heater 438 begins to harden coating material 432 applied to interior surface 108 of pipe 100.

Concurrent with, or substantially simultaneously to heating interior surface 108 of pipe 100 to cure coating material 432, motorized apparatus 102 generates one or more infrared images of work location 442 using infrared sensor 440, which generates information regarding possible defects associated with pipe 100 and/or coating material 432 applied to interior surface 108 of pipe (see step 510 of FIG. 5). For example, controller 402 operates maintenance device actuator 134 to move maintenance device 112 along a length of body assembly 114 and/or rotate maintenance device 112 about longitudinal axis 118 to orient infrared sensor 440 towards interior surface 108 of pipe 100 and directs infrared sensor 440 to capture the infrared images of coating material 432 applied to pipe 100.

Using the infrared images captured of work location 442, a NDE is performed of work location 442 (see step 512 of FIG. 5). In one embodiment, the NDE is performed by controller 402. In another embodiment, the NDE is performed by remote operator 416 or some other entity external to motorized apparatus 102. In one embodiment, the NDE is performed on pipe 100 and coating material 432 applied to pipe 100 simultaneously. In another embodiment, the NDE is performed on pipe 100 and/or coating material 432 applied to pipe 100 separately. Generally, the thermal images reveal defects that may be present in pipe 100 and/or coating material 432 applied to pipe 100. For example, heat may dissipate faster through a thicker wall of coating material 432 and/or pipe 100 in contrast to a thinner wall of coating material 432 and/or pipe 100, with the variations in time indicative of wall thinning that can be addressed during repair operations.

For example, a previous set of thermal images of interior surface 108 of pipe 100 at work location 442 can be used to generate a first thermal variation over time, with a new set of thermal images of interior surface 108 of pipe 100 at work location 442 used to generate a second thermal variation over time. If, for example, the second thermal variation over time is greater than the first thermal variation over time, this may indicate that coating material 432 and/or sidewall 106 of pipe 100 at work location 442 is thinner, and additional coating material 432 may be applied to interior surface 108 of pipe 100 to implement a repair operation on pipe 100.

The use of concurrent cure and NDE of coatings applied to pipe 100 increases the speed at which repairs may be made to pipe 100, thereby providing a technical benefit over the art. For example, typical repair processes apply a coating to the pipe, and wait until the coating has cured before heating the repaired section and capturing thermal images of the repair site. This type of two-stage process increases the total amount of time used to repair the site and verify the repair through a NDE process and is inefficient. In contrast, the concurrent heat, cure, and NDE processes described herein enable the repair and NDE processes to occur substantially simultaneously, thereby reducing the total time used to both perform the repair and verify that the repair is free from defects.

In some embodiments, motorized apparatus 102 operates autonomously or semi-autonomously under direction of controller 402 to perform one or more of the previous steps described above. In other embodiments, remote operator 416 (see FIG. 4) utilizes base station 414 to interact with controller 402 and/or motorized apparatus 102 directly to perform one or more of the previous steps described above. In some embodiments, the previous steps described above are performed in response to motorized apparatus 102 receiving instructions from another entity, such as base station 414.

Embodiments described herein provide motorized apparatus and systems that are useful for maintenance and inspection in a variety of applications. For example, some embodiments are used to maintain steam pipes and include a steam pipe weld repair system. In some embodiments, the steam pipe weld repair system is manually controlled. In further embodiments, the system is at least partly automated. Sensor data and operator inputs, including the selection and rejection of regions to repair will be logged and used to refine algorithms to improve automated performance, reducing operator workload with use.

Embodiments of the motorized apparatus are able to move with protected sensing and maintenance equipment through steam pipes that can range from 6 to 36 inches in diameter with, for example, wall temperatures of 350° F. and an ambient atmosphere that is 250° F. with 100% relative humidity. The motorized apparatus adapts to variable pipe diameters using actuated leg assemblies. The actuated leg assemblies keep the motorized apparatus centered radially in the pipe. In addition, the motorized apparatus enables the maintenance device to undertake linear travel that is twice the diameter of the pipe.

In addition, in some embodiments, at least one driven wheel is used to contact the pipe's inner wall. In some embodiments, the friction surface of each wheel is high temperature silicone, which has an operating temperature of over 550° F. and has desirable high friction and low thermal conductivity, which helps thermally isolate the motorized apparatus from the hot pipe's inner walls. Neodymium magnet motors may be used throughout the robotic motorized apparatus, including for the drive wheels, motion pod linkage actuators, and a maintenance device positioning system. Neodymium magnets have a Curie temperature of 589° F., allowing properly sized motors to perform well in relatively high temperature environments without additional cooling.

The arrangement of motion pods in the forward and aft positions of the robotic motorized apparatus allows the motorized apparatus to both push and pull itself through terrain such as expansion joints and diameter reducing couplings. Antagonistically positioned drive wheels allow the motorized apparatus to increase motorized apparatus traction as necessary by pressing harder against the inner wall of the pipe while driving, ensuring that the motorized apparatus can pull at least 500 feet worth of tether without increasing the weight of the motorized apparatus. The motorized apparatus utilizes actuator force, not motorized apparatus weight, to increase traction.

Because the maintenance device may rotate around an axial track and the direction of gravity relative to the motorized apparatus may be sensed and used to rotate sensor data, there is no preferred roll orientation for the motorized apparatus and therefore there is no need for complicated steering mechanisms on the motorized apparatus to re-orient the motorized apparatus as it traverses pipe sections.

The maintenance device carries sensors and tools required to perform buildup repairs when the motorized apparatus is stationary relative to the pipe and provides a fixed frame of reference for control. For example, in some embodiments, the maintenance device includes an ablation laser processing head for cleaning, a forming gas nozzle for controlling the atmosphere at the worksite, a laser processing head for cladding buildup repairs, a suction nozzle to continually remove debris as it is created, and an array of depth sensors. The full repair tool module of the maintenance device is mounted to a two degree of freedom motion platform that allows the tool to rotate around and two pipe diameters along the motorized apparatus robot's axial track. Distributing the repair tools radially around the module allows the motorized apparatus to position each tool relative to the work site by knowing the fixed angular offset between each tool and the depth scanning system. The individual inspection and repair tools are mounted a fixed distance away from the center of rotation so that the nominal working distance from each sensor or tool to the work piece may be maintained. The standoff distance can be manually adjusted to accommodate repairs to different pipe diameters.

In some embodiments, the motorized apparatus takes advantage of a gaseous cooling system to ensure electronics are maintained at operational temperatures. The cooling gas also serves as forming gas for the laser processing system and is dispensed through a nozzle to the repair site after circulating through specific regions of the robot's body and maintenance device to provide targeted cooling for electronics. In some embodiments, a metallic additive manufacturing process is used to provide a housing that protects consumer grade electronics in environments up to 700° F. using air cooling and up to 3000° F. using fluid (e.g., air or water) cooling.

A multi-function tether carries the cooling/forming gas to the motorized apparatus along with communications and power transmission. For example, in some embodiments, power is supplied for the maintenance device through two fiber optic cables and electrical power is transmitted through conductors inside of the tether. Welding wire will be fed through a dedicated channel and communications will be performed using standard Ethernet technologies. A vacuum channel will serve as a return path for collected debris allowing for longer operations than would be possible if debris were collected inside of the motorized apparatus. As a result, the tether allows the motorized apparatus to carry less components and have a reduced weight.

In further embodiments, the tether includes a casing having a low-friction, low-thermally conductive applique to reduce the conductive heating between the hot pipe wall and tether and lowering the pulling force required by the motorized apparatus to move the tether long distances. One example applique is a helical coil laced with ceramic beads that provides small surface area contact between the tether, low thermally conductive beads, and the inside of the pipe, reducing heat transfer from the pipe to the tether. In addition, the applique provides low friction rolling and sliding between the bearing beads and therefore the tether and the pipe wall. Wrapping the tether with a low-friction, low-thermal conductivity applique allows the motorized apparatus to operate over greater distances by reducing the conductive heating between the hot pipe wall and tether and lowering the pulling force required by the motorized apparatus to move the tether.

In some embodiments, the motorized apparatus is equipped with two types of sensors: visual sensors and depth sensors. A situational awareness camera will be mounted inside a cooled chamber of an aft motion housing, looking in the axially forward direction. From this position, this sensor will allow the operator to visualize the pipe section that the maintenance device has access to as well as to monitor the motions of the maintenance device during a repair operation. In at least some embodiments, it will be known how far into the pipe the repair site is located before the motorized apparatus enters a pipe to perform repairs. The operator can then drive the motorized apparatus quickly to a distance that is just short of the expected repair site, estimating distance by dispensed tether length, and then drive forward slowly while watching the feed from this situational awareness camera to park the motorized apparatus so that the repair site is within the field of regard of the maintenance tool.

In some embodiments, the maintenance device carries an array of depth sensors that are housed in cooled cavities. By rotating around and traversing along the axis of the axial track, the array of depth sensors will collect a complete point cloud model of the inside surface of the pipe in coordinates that are fixed to the robot, which is stationary relative to the pipe. This fixed coordinate system, tied through the motorized apparatus to the pipe, allows the motorized apparatus to know its surroundings blindly, making the motorized apparatus robust to challenges such as fogged over lenses. In some embodiments, a process monitoring visual camera is mounted to the laser processing head to allow for visual feedback. Optical windows in front of each camera may be equipped with heaters to minimize fogging. Inertial measurement units mounted inside of cooled housings that are rigidly oriented relative to all sensors will allow the motorized apparatus to measure the direction of gravity and therefore establish the orientation of collected data. Once a comprehensive set of depth data has been collected over the field of regard of the maintenance device, the point cloud may be processed into a surface model using a tessellation algorithm. In parallel, a cylindrical surface may be fit to the point cloud with greater weight applied during the fit to points farthest away from the pipe's bottom dead center. Comparing the tessellated, as measured surface model, to the idealized cylindrical surface model, the system may calculate a volumetric region for cladding buildup in fixed robot coordinates. The model may be analyzed and automatically tapered at the forward and aft boundaries of the maintenance tool's field of regard to ensure that smooth transitions between the original pipe and built up regions are realized. Additionally, the model facilitates a taper between repairs if the motorized apparatus must be moved to address long repair sites. In some embodiments, the model may be used to vary the parameters of a repair operation performed on pipe 100. For example, at locations of pipe 100 where the model indicates excessive wall thinning (e.g., due to coating material degradation), the speed of motorized apparatus 102 may be reduced to increase an amount of coating material applied to pipe 100 at those locations, thereby providing a technical benefit of improving the efficiency of implementing repairs to pipe 100. In another embodiment, the model may be used to track how pipe 100 has deteriorated over time, which allows for planning a repair to pipe 100 in order to reinforce sections of pipe 100 that may be particular susceptible to failures.

In some embodiments, laser cleaning and welding of pipes creates high strength repairs. Dispensing forming gas and suctioning debris during cleaning (center frame) removes debris as the repair site is both cleaned and repairs are made. In further embodiments, the motorized apparatus utilizes laser ablation to clean the repair site. For example, some laser ablation systems include a nanosecond scale pulsed laser and a galvanometer scanner to steer the ablating laser beam. The laser ablation system are sized to be incorporated into the maintenance device. In some embodiments, some components of the laser ablation system are located remote from the motorized apparatus such as at a base station of the motorized apparatus.

Following the completion of a cladding repair, the scanning and mapping systems may collect and produce another depth map of the repair site and the laser ablation system may be used to perform any final cleanup if necessary.

In some embodiments, motorized apparatus 102 is used to perform a maintenance operation for pipe 100, such as a repair of interior surface 108. An example repair sequence includes the following steps:

1. Recognize a need for maintenance over a given stretch of pipe using an independent inspection approach and distance to the repair site from the access port.
2. Prepare an access port by opening the access point and ensuring that the pipe walls are no warmer than 350° F.
3. Maintenance system (Motorized apparatus and base station) are delivered to access site.
4. Motorized apparatus is powered up, consumables are loaded, and system readiness checks are performed.
5. Motorized apparatus is inserted into the prepared access port.
6. Motorized apparatus is commanded to travel a distance that is just shy of the expected repair site.
7. Inspection system configured to scan pipe walls while motorized apparatus drives into pipe with intention of locating pre-identified areas in need of repair.
8. When an area in need of repair is located, motorized apparatus position is tuned to ensure region in need of repair falls within the field of regard of the repair tool
9. Operator verifies motorized apparatus position relative to repair area by looking at sensor data displayed on base station.
10. Motorized apparatus parks at the selected location relative to the pipe and region in need of repair.
11. Inspection system performs a detailed scan (including depth) of the workspace, with sensed information traceable back to the location of the motorized apparatus relative to the pipe.
12. Operator reviews workspace scan and selects/confirms regions for surface preparation.
13. Repair tool is driven relative to the motorized apparatus-based frame of reference to prepare selected regions for buildup repair.
14. Laser ablation system cleans surface to be repaired while debris management system removes loosened material.
15. Inspection system performs detailed scan (including depth) of prepared surfaces.
16. Operator selects/confirms locations of specific sites to perform repairs (all relative to motorized apparatus's frame of reference which is firmly fixed to the pipe because the motorized apparatus is parked)
17. Toolpath generated for repair tool to perform buildup repair based on captured 3D model and operator inputs.
18. Operator reviews toolpath and accepts or returns to step 15 for refinement.
19. Repair tool follows toolpath. It is possible to perform the operation with little or no visual feedback because tool is controlled relative to the motorized apparatus's frame of reference and that is fixed to the pipe.
20. Inspection system performs detailed scan (including depth) of built-up surfaces.
21. System analyzes generated 3D map and generates recommendation for rework or repair completion.
22. Operator reviews system recommendation and returns to step 16 or proceeds.
23. Cleaning tool performs final cleanup of entire reachable area.
24. If more repairs are needed, return to step 6, otherwise, motorized apparatus backs out of pipe, maintenance system is removed, and pipe is returned to service.

Technical benefits of the methods, systems, and apparatus described herein include: (a) reducing the time to inspect and/or repair pipes; (b) enabling inspection and repair of an interior cavity of a pipe at greater distances from an access opening; (c) increasing the information that is available during a maintenance operation of an interior cavity of a pipe; (d) providing an apparatus configured to withstand relatively high temperatures and pressures within a pipe; (e) providing an apparatus that is configured to fit within a range of pipe sizes and traverse different transitions; (f) providing precise positioning of a maintenance device within a pipe; and (g) increasing the repair speed for coatings applied to the interiors of pipes using a concurrent cure and NDE process.

Example embodiments of systems and methods for use in maintaining pipes are described above in detail. The methods and systems are not limited to the specific embodiments described herein, but rather, components of systems and/or steps of the methods may be utilized independently and separately from other components and/or steps described herein. For example, the method may also be used in combination with other components and are not limited to practice only with the pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a pipe having a sidewall defining an interior cavity and having an interior surface, said system comprising:
a motorized apparatus sized to fit within the interior cavity of the pipe, said motorized apparatus comprising:
a body assembly extending along a longitudinal axis;
at least one maintenance device coupled to said body assembly, said at least one maintenance device comprising:
a sprayer configured to apply at least one coating material to the interior surface of the pipe;
a heater configured to heat the interior surface of the pipe; and
an infrared sensor configured to generate infrared images of the interior cavity of the pipe;
a plurality of leg assemblies coupled circumferentially around said body assembly; and
a plurality of driven members coupled to said plurality of leg assemblies, wherein said plurality of driven members are configured to engage with the interior surface of the pipe; and
at least one controller communicatively coupled to said motorized apparatus and configured to:
move said motorized apparatus through the pipe using said plurality of driven members until a work location on the interior surface of the pipe is proximate to said body assembly;
apply the at least one coating material to the interior surface of the pipe at the work location using said sprayer;
heat the interior surface of the pipe at the work location using said heater to begin a cure of the at least one coating material;
generate one or more infrared images of the work location using said infrared sensor while using said heater to cure the at least one coating material; and
perform a non-destructive evaluation (NDE) of the work location based on the one or more infrared images while using the heater to cure the at least one coating material.

2. The system of claim 1, wherein:
said controller is further configured to pre-heat the interior surface of the pipe at the work location using said heater prior to applying the at least one coating material.

3. The system of claim 1, wherein:
said heater comprises an induction heater.

4. The system of claim 1, wherein:
said controller is further configured to perform the NDE for one or more of the at least one coating material and/or the interior surface of the pipe.

5. The system of claim 1, wherein:
the at least one coating material includes one or more of a thermoset polymer, an adhesive, and/or a polyethylene.

6. The system of claim 1, wherein:
the at least one coating material includes an exothermic material that heats the interior surface of the pipe.

7. The system of claim 6, wherein:
said controller is further configured to rotate said at least one maintenance device about the longitudinal axis until at least one of said sprayer, said heater, and/or said infrared sensor are proximate to the work location.

8. The system of claim 1, wherein:
said at least one maintenance device is movably coupled to said body assembly, and
said controller is further configured to move said at least one maintenance device along the longitudinal axis of said body assembly until said at least one maintenance device is proximate to the work location.

9. The system of claim 1 further comprising:
at least one actuator assembly coupled to said plurality of leg assemblies and configured to:
actuate said plurality of leg assemblies; and
control a force of said driven members against the interior surface of the pipe.

10. The system of claim 1, further comprising:
a tether coupled to said motorized apparatus and configured to provide the at least one coating material to said motorized apparatus.

11. The system of claim 10, wherein:
said tether comprises a plurality of projections that thermally and frictionally isolate said tether from the interior surface of the pipe.

12. A motorized apparatus for use in maintaining a pipe having a sidewall defining an interior cavity and having an interior surface, said motorized apparatus comprising:
a body assembly extending along a longitudinal axis;
at least one maintenance device coupled to said body assembly, said at least one maintenance device comprising:
a sprayer configured to apply at least one coating material to the interior surface of the pipe;
a heater configured to heat the interior surface of the pipe; and
an infrared sensor configured to generate infrared images of the interior cavity of the pipe;
a plurality of leg assemblies coupled circumferentially around said body assembly; and
a plurality of driven members coupled to said plurality of leg assemblies, wherein said plurality of driven members are configured to engage with the interior surface of the pipe and move said motorized apparatus through the interior cavity of the pipe,
wherein the motorized apparatus is configured to receive instructions to:
apply the at least one coating material to the interior surface of the pipe at a work location using said sprayer;
heat the interior surface of the pipe using said heater to begin a cure of the at least one coating material;
generate one or more infrared images of the work location using said infrared sensor while using said heater to cure the at least one coating material; and
perform a non-destructive evaluation (NDE) of the work location based on the one or more infrared images while using the heater to cure the at least one coating material.

13. The motorized apparatus of claim 12, further comprising:
at least one actuator assembly coupled to said plurality of leg assemblies and configured to actuate said plurality of leg assemblies and control a force of said driven members against the interior surface of the pipe.

14. The motorized apparatus of claim 12, wherein:
said heater comprises an induction heater.

\* \* \* \* \*

UNITED STATES PATENT AND TRADEMARK OFFICE
CERTIFICATE OF CORRECTION

| | | |
|---|---|---|
| PATENT NO. | : 12,031,660 B2 | Page 1 of 1 |
| APPLICATION NO. | : 17/589625 | |
| DATED | : July 9, 2024 | |
| INVENTOR(S) | : Alexander Kyle Duncan et al. | |

It is certified that error appears in the above-identified patent and that said Letters Patent is hereby corrected as shown below:

In the Specification

Column 1, before the heading BACKGROUND, please insert:
--STATEMENT REGARDING FEDERALLY SPONSORED RESEARCH OR DEVELOPMENT
This invention was made with Government support under DE-AR0001328 awarded by DOE, Office of ARPA-E. The Government has certain rights in this invention.--

Signed and Sealed this
Fifth Day of August, 2025

Coke Morgan Stewart
*Acting Director of the United States Patent and Trademark Office*